United States Patent [19]
Woollenweber

[11] 3,798,906
[45] Mar. 26, 1974

[54] APPARATUS FOR REDUCING POLLUTANTS IN ENGINE EXHAUST GASES

[75] Inventor: William E. Woollenweber, Indianapolis, Ind.

[73] Assignee: Wallace-Murray Corporation, New York, N.Y.

[22] Filed: May 22, 1972

[21] Appl. No.: 255,619

[52] U.S. Cl..................... 60/598, 60/280, 60/302
[51] Int. Cl............................................. F02b 37/04
[58] Field of Search ................ 60/13, 280, 302, 282

[56] References Cited
UNITED STATES PATENTS

| | | | |
|---|---|---|---|
| 2,583,651 | 1/1952 | Horning | 60/13 |
| 2,674,521 | 4/1954 | Houdry | 60/13 N |
| 3,247,666 | 4/1966 | Behrens | 60/302 |
| 3,303,993 | 2/1967 | Andrews et al. | 60/280 |

FOREIGN PATENTS OR APPLICATIONS
143,091  11/1953  Sweden.................................. 60/13

Primary Examiner—Carlton R. Croyle
Assistant Examiner—Warren Olsen
Attorney, Agent, or Firm—Cameron, Kerkam, Sutton, Stowell & Stowell

[57] ABSTRACT

Disclosed is a method and apparatus for reducing internal combustion engine pollutant emission by combining a multistage, exhaust manifold, thermal reactor with an engine cylinder charging turbocharger having its turbine component interposed between two of the reactor stages. The reactor receives exhaust gases from the engine exhaust manifold and the turbocharger which air-charges the cylinders of the engine is driven by its turbine component through which are expanded heated gases passing between stages of the thermal reactor.

3 Claims, 5 Drawing Figures

PATENTED MAR 26 1974      3,798,906

APPARATUS FOR REDUCING POLLUTANTS IN ENGINE EXHAUST GASES

BACKGROUND OF THE INVENTION

Efforts on the part of major automobile manufacturers to reduce pollutants in the exhaust gases of conventional gasoline piston engines for use in motor vehicles are well known and consist primarily in investigating or developing a system or combination of systems such as the use of a thermal reactor, HC/CO catalytic converter, nitrogen oxide catalytic converter, exhaust gas recirculation, air injection, etc. Since catalytic converters are vulnerable to leaded fuels, and for other reasons, the use of thermal reactors to reduce exhaust emissions is promising. The patent application Ser. No. 176,468 filed Aug. 31, 1971, and assigned to the assignee of the present application describes the use of an exhaust gas driven device known as a turbocharger in combination with the conventional piston engine in such a way so as to significantly reduce the pollutant in the engines' exhaust. Reference is made, in that application, to the use of the turbocharger with an engine also equipped with a thermal reactor whereby the energy liberated by the reactor can be utilized in driving the turbine of the turbocharger.

The invention described and disclosed herein envisages the combination of a turbocharger turbine component and a multi-stage thermal reactor in such a way so as to enhance the over-all oxidizing reaction in the reactor through better mixing of the incompletely oxidized carbon compounds (allowing available oxygen molecules to combine more easily with HC and CO and thereby complete the chemical conversion to $H_2O$ and $CO_2$). The turbocharger turbine component is driven by the heated gases passing between stages of the thermal reactor and the compressor component of the turbocharger functions to air-charge the cylinders of the engine whose exhaust gases are treated by the thermal reactor. The arrangement described herein thus allows a more complete chemical reaction to take place and at the same time extracts energy from the reaction process. The turbocharger turbine component utilizes the energy liberated by the reactor to drive the turbocharger compressor component which, in turn, compresses fresh air to be ducted to the induction system of the engine. In this manner, energy is returned to the engine thru compressed induction air, thereby increasing the thermal efficiency of the engine cycle.

DESCRIPTION OF THE PREFERRED EMBODIMENTS

Figure 1:
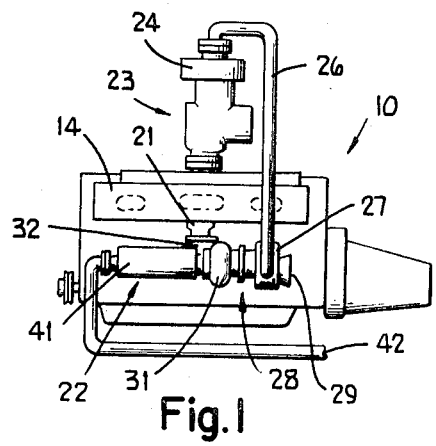
FIG. 1 is a side view somewhat schematically illustrating a gasoline fueled internal combustion engine with a two stage thermal reactor and turbocharger combined as envisaged by the present invention.
Figure 2:
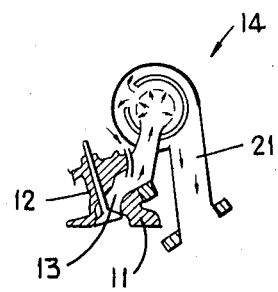
FIG. 2 is a side sectional view schematically illustrating the action of the initial stage of the thermal reactor in accomodating engine exhaust gases.
Figure 3:
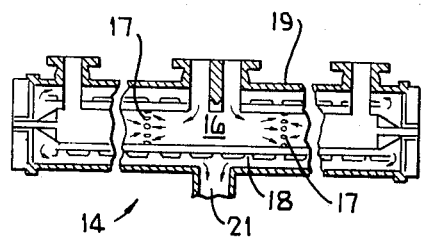
FIG. 3 is a side sectional view of the thermal reactor stage shown in FIG. 2.

Referring initially to FIGS. 1-3, there is shown at 10 a conventional internal combustion engine, gasoline fueled, having a head casting 11 (FIG. 2), exhaust valves 12, and exhaust ports 13. As may best be seen in FIGS. 2 and 3, a generally cylindrical thermal reactor 14 is mounted to accomodate exhaust gases issuing from the engine cylinder head exhaust ports 13. The thermal reactor is preferably of a conventional type such as that disclosed in U.S. Pat. No. 3,247,666 and consists essentially of a core chamber receiving exhaust gases from the engine head exhaust ports. The gases are forced in a tortuous path through chamber ports 17, through passages between the shield 18 and the core wall, through the passage between shield 18 and the insulated outer wall 19, and exit through the discharge passage 21. This reactor 14 forms the first stage of the system, the second stage, indicated generally at 22 in FIG. 1, will be subsequently described. It may, however, be found that due to the two stage system the first stage thermal reactor can be simplified somewhat in that portions of the conventional tortuous path can be eliminated.

Referring to FIG. 1, the carburetor 23 serves to atomize the gasoline supplied to it for delivery to the engine. Carburetor 23 is provided with an air cleaner 24 supplied with air through conduit 26 which is connected to the discharge side of a compressor component 27 forming a part of an exhaust gas driven turbocharger indicated generally at 28. As is conventional, the compressor component 27 has an intake passage 29 and the compressor is driven by a turbine component 31 which has its intake 32 directly connected to the passage 21. After the gases leaving the initial reactor stage 14 are expanded through the wheel of the turbine component 31, they are discharged into a reactor housing 41 which forms the second reactor stage.

The interior construction of the thermal reactor is not shown in detail since it is conventional and, in general, takes the form of concentric tubes which force the gases to flow in a tortuous path, providing the required dwell time for incompletely burned hydrocarbons to be further oxidized. The concentric tube construction referred to above is shown in more detail in FIG. 5 to be subsequently described. The gases leaving the reactor stage 41 are directed by exhaust tubing 42 to a muffler (not shown) for eventual discharge into the atmosphere.

Figure 4:
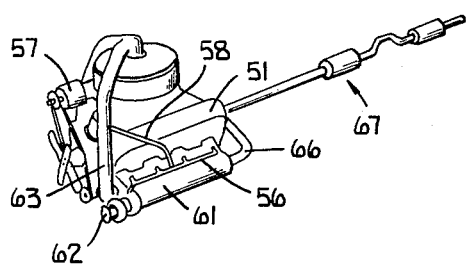
FIG. 4 is a perspective view schematically showing the multi-stage reactor and turbine component of the turbocharger enclosed in a unitary housing and mounted on an engine.
Figure 5:
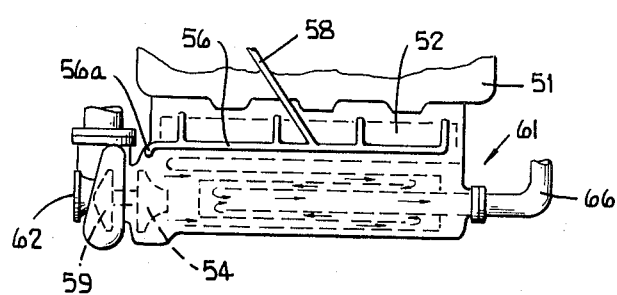
FIG. 5 is a fragmentary, top plan view of a portion of the structure shown in FIG. 4.

In the modified form of the system shown in FIGS. 4 and 5, the two thermal reactor stages and the turbine component of the turbocharger are incorporated into a unitary housing. FIG. 4 illustrates schematically a V-type eight cylinder engine having a cylinder head casting 51 to which is closely coupled an initial stage thermal reactor 52. The interior construction of the reactor 52 is not shown in detail but it is of conventional construction, of the type shown in FIG. 3, and receives exhaust gases from the engine cylinders. The gases move through a tortuous path in the reactor 52 to enter the turbine wheel 54 (FIG. 5). Auxiliary air, as is conventional, is supplied to the reactor by means of an air injection pump 57 (FIG. 4) through tube 58 or, alternatively, could be supplied through internal passages in the cylinder head. Air is also injected, by branch tube 56a, into the entrance to turbine wheel, this air being utilized in the further oxidation of the gases in the subsequent reactor stage 61. This unitary construction has the advantage of minimizing the heat loss from the exhaust gases prior to their impingement on the turbine wheel thus enhancing the efficiency of the system.

As will be evident from FIGS. 4 and 5, in expanding through the turbine wheel the gases rotate the turbine wheel which in turn drives the wheel 59 (FIG. 5) of the compressor component of the turbocharger and air drawn into the compressor inlet 62 is compressed and, by means of duct 63, is directed to the engine air intake. It will be understood that dual systems, one for each bank of four cylinders might be used, as illustrated in FIG. 4, or, by proper ducting, a single system might be utilized on the engine.

Exiting from the turbine wheel, the gases, including the injected air move through the second stage thermal reactor 61 in which concentric tubes provide a tortuous path for the gases establishing the dwell time necessary for their final combustion. The gases are then ducted, through piping 66, to a conventional muffler system indicated generally at 67 in FIG. 4.

The method and apparatus of the present invention utilizes the mixing action inherent in passage of the gases through the turbine component of the turbocharger to enhance the functioning of the second stage of the thermal reactor. The turbocharger turbine component utilizes a portion of the thermal energy generated in the initial reactor stage to provide air for charging the engine and the thermal efficiency of the complete engine cycle is increased. The more complete conversion into non-polluting compounds of the carbon compounds exhausting from the engine substantially lowers hydrocarbon and carbon monoxide emission by the engine.

I claim:

1. Apparatus for reducing pollutants in the emission exhaust gases of an internal combustion engine having an exhaust manifold and engine cylinders, said apparatus comprising, in combination, a first stage thermal reactor connected to the exhaust manifold of the engine so as to receive the entire output of exhaust gases therefrom, and having tortuous pathways for the cooling flow of such exhaust gases therethrough, a turbocharger connected to the engine cylinders for supplying air thereto, a second stage thermal reactor connected to the turbocharger to receive exhaust gases therefrom after such gases have expanded through the turbocharger to drive the turbine component thereof and said second stage reactor having tortuous pathways for the flow of the gases therethrough, said turbocharger having its turbine component interposed between the first and the second stage thermal reactors whereby gases exiting from the first stage thermal reactor are expanded through said turbine component prior to entry into the second stage thermal reactor from whence they exit to a muffler arrangement.

2. An apparatus as claimed in claim 1 in which each of said reactor stages have separate housings and said turbocharger turbine component is interposed in the connecting passage between said reactor housings.

3. An apparatus as claimed in claim 1 in which said two reactor stages and said turbocharger turbine component are incorporated into a unitary housing.

* * * * *